(12) United States Patent
Yuan et al.

(10) Patent No.: US 10,974,191 B2
(45) Date of Patent: Apr. 13, 2021

(54) AIRCRAFT ENVIRONMENTAL CONTROL AND FUEL TANK INERTING COUPLING SYSTEM BASED ON MEMBRANE SEPARATION METHOD

(71) Applicants: BEIHANG UNIVERSITY, Beijing (CN); Weixing Yuan, Beijing (CN); Yan Zheng, Beijing (CN); Bin Yu, Beijing (CN)

(72) Inventors: Weixing Yuan, Beijing (CN); Yan Zheng, Beijing (CN); Bin Yu, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 16/624,751

(22) PCT Filed: Jun. 22, 2018

(86) PCT No.: PCT/CN2018/000230
§ 371 (c)(1),
(2) Date: Dec. 19, 2019

(87) PCT Pub. No.: WO2018/233274
PCT Pub. Date: Dec. 27, 2018

(65) Prior Publication Data
US 2020/0261842 A1 Aug. 20, 2020

(30) Foreign Application Priority Data
Jun. 22, 2017 (CN) .......................... 201710482398.0

(51) Int. Cl.
*B01D 53/22* (2006.01)
*B01D 53/26* (2006.01)
(Continued)

(52) U.S. Cl.
CPC ......... *B01D 53/226* (2013.01); *B01D 53/268* (2013.01); *B64D 13/06* (2013.01);
(Continued)

(58) Field of Classification Search
None
See application file for complete search history.

(56) References Cited

U.S. PATENT DOCUMENTS

2005/0279208 A1* 12/2005 Schwalm ............... B01D 53/22
  96/4
2007/0062371 A1* 3/2007 Eilers ..................... B01D 53/22
  95/138
(Continued)

FOREIGN PATENT DOCUMENTS

CN 101881490 A * 11/2010 ............. B01D 53/22

OTHER PUBLICATIONS

English language machine translation for CN 101881490 A. Retrieved from translationportal.epo.org on Sep. 1, 2020. (Year: 2020).*

*Primary Examiner* — Jason M Greene
(74) *Attorney, Agent, or Firm* — Mark Clodfelter

(57) ABSTRACT

Disclosed is an aircraft environmental control and fuel tank inerting coupling system based on a membrane separation method. The dehumidification of gas in an aircraft environmental control system and the separation of oxygen and nitrogen in a fuel tank inerting system are realized respectively, based on the selective permeability of a membrane to water vapour/air and oxygen/nitrogen. In the coupling system, part of drying gas passing through a membrane dehumidification heat exchanger (5) enters a membrane air separator (9), and the other part thereof is cooled through a large expansion turbine (8) and then directed into a cockpit for refrigeration; and nitrogen-rich gas generated by the membrane air separator (9) is directed into a fuel tank for inerting. Oxygen-rich gas is mixed with gas supplied by the (Continued)

environmental control system, thus increasing the oxygen content of gas supplied by the aircraft cockpit.

7 Claims, 1 Drawing Sheet

(51) Int. Cl.
    *B64D 13/06*     (2006.01)
    *B64D 37/32*     (2006.01)

(52) U.S. Cl.
    CPC ........ B64D 37/32 (2013.01); *B01D 2053/224* (2013.01); *B64D 2013/0618* (2013.01); *B64D 2013/0651* (2013.01); *B64D 2013/0662* (2013.01); *B64D 2013/0681* (2013.01)

(56) References Cited

U.S. PATENT DOCUMENTS

| | | | |
|---|---|---|---|
| 2011/0239866 A1* | 10/2011 | Coan | B01D 53/228 |
| | | | 96/9 |
| 2017/0015557 A1* | 1/2017 | Daniello | B01D 53/226 |
| 2019/0001264 A1* | 1/2019 | Rheaume | B01D 53/268 |

* cited by examiner

AIRCRAFT ENVIRONMENTAL CONTROL AND FUEL TANK INERTING COUPLING SYSTEM BASED ON MEMBRANE SEPARATION METHOD

TECHNICAL FIELD

The present invention relates to a coupling system for aircraft environment control and fuel tank inerting based on the membrane separation is provided.

BACKGROUND OF THE INVENTION

When the aircraft works in a high humidity condition water vapor will have an adverse impact on the aircraft environmental control system, so air dehumidification is required in the aircraft environmental control system. At present, all the advanced aircrafts in the world adopt the high-pressure water removal environment control system. It has the advantages of high water removal efficiency, large refrigeration capacity, but it has many components, leading to complex structure and large weight High pressure air membrane dehumidification technology relies on the pressure difference of water vapor on both sides of the membrane to drive the water vapor diffusion across the membrane. Therefore, in the process of dehumidification, there is no need for condensation and heat release of water vapor, which avoids the loss of cooling capacity and there is no need to use a water separator with high quality. Therefore, the application of membrane dehumidification technology in aircraft environmental control system has the advantages of high efficiency, energy saving and large refrigeration capacity. In addition, because the metal condenser and water separator are omitted in the system, the structure of the system is simple and the total weight is low.

In flight, the fuel tank of an aircraft has a certain probability of combustion and explosion. In order to ensure flight safety, the fuel tank needs to be inerted. At present, many advanced aircrafts in the world adopt the tank inerting system based on membrane separation method. Depending on the different rate of oxygen and nitrogen passing through the membrane, nitrogen rich air is produced to enter the tank to achieve the inerting purpose.

DESCRIPTION OF THE INVENTION

The dehumidification membrane in the dehumidification system and the oxygen nitrogen separation membrane in the oxygen nitrogen separation system have similar requirements for inlet air temperature, pressure, pollutant particles size and oil content. The air dehumidified by the dehumidification membrane has lower moisture content, which is helpful to improve the efficiency of the oxygen nitrogen separation membrane. Therefore, it is feasible and advanced to couple the membrane dehumidification aircraft environmental control system with the membrane separation fuel tank inerting system. In addition, the oxygen enriched air produced by the oxygen nitrogen separation membrane can be mixed with the air supply of the cabin, which can clearly improve the oxygen content of the cabin air and improve the comfort of the aircraft crews and passengers. The coupling system can share the temperature and pressure regulation and filtering devices, reduce the total weight of the two independent systems, make full use of the bleed air from the engine, and reduce the total compensation loss of the systems. Therefore, compared with two independent systems, the coupled system has more advantages.

In summary, this invention aims to realize the dehumidification function in the aircraft environmental control system, the oxygen nitrogen separation function in the fuel tank inerting system respectively, and succeed the coupling of the two system based on the membrane separation technology.

In the coupling systems of aircraft environment control and fuel tank inerting based on membrane separation method, this aircraft environment control system has higher dehumidification efficiency, larger refrigeration capacity, and simpler system structure. Through comprehensive analysis of the aircraft environmental control system and the fuel tank inerting system, the coupling system proposed in the invention reasonably combines the two independent systems, and reduces the total weight of the system by sharing the temperature and pressure regulating and filtering components. The oxygen enriched air in the inerting system can also be mixed with the air supply of the environmental control system to improve the oxygen content of the cabin. By making full use of compressed air from the engine, the total compensation loss is reduced, and the performance of aircraft environmental control system and fuel tank inerting system is clearly improved, leading the performance of the whole system to a higher stage. Moreover, as the environmental control system adds efficient filtering system, the quality of air supply in the cockpit and cabin of the aircraft is significantly improved, which contributes to the aircraft development trend of safety, efficiency and health.

The coupling system of aircraft environmental control and fuel tank inerting based on membrane separation method is composed of: primary heat exchanger, compressor, secondary heat exchanger, filter, membrane dehumidifier, large expansion turbine, membrane oxygen and nitrogen separator, flow limiting valve, small expansion turbine, fan, and six three-way valves for air separation/mixing.

The operation process is as follows: the engine bleed air is first regulated to the appropriate temperature and pressure through the primary heat exchanger, compressor and secondary heat exchanger, filtered by the filter to remove the oil and dust, and then enters the membrane dehumidifier for dehumidification. The dehumidified dry air is divided into two streams according to the set ratio. A smaller air stream flows into the shell side of the membrane dehumidifier as purge air after being depressurized by a small expansion turbine, while a larger air stream is divided into two streams. The mainstream flows into the cabin for cooling after being expanded by a large expansion turbine, and the other stream enters the membrane air separator for oxygen and nitrogen separation. After separation, the nitrogen rich air is regulated by the flow limiting valve and then flows to the fuel tank for inerting purpose. Part of the oxygen enriched air is mixed with the air supply of the cabin to improve the oxygen content of the cabin. The ram air is mixed with the airstream at the purge air outlet of the membrane dehumidifier as the cold source of both the secondary heat exchanger and the primary heat exchanger. After being ventilated by the fan, it is mixed with the other part of the oxygen rich air and then is discharged to the atmosphere together.

DETAILED DESCRIPTION OF THE INVENTION

The coupling system of aircraft environment control and fuel tank inerting based on membrane separation method according to one embodiment of the invention will be described in detail in combination with the attached drawings. However, the protection scope of the invention is not limited to the following embodiments.

Figure 1:
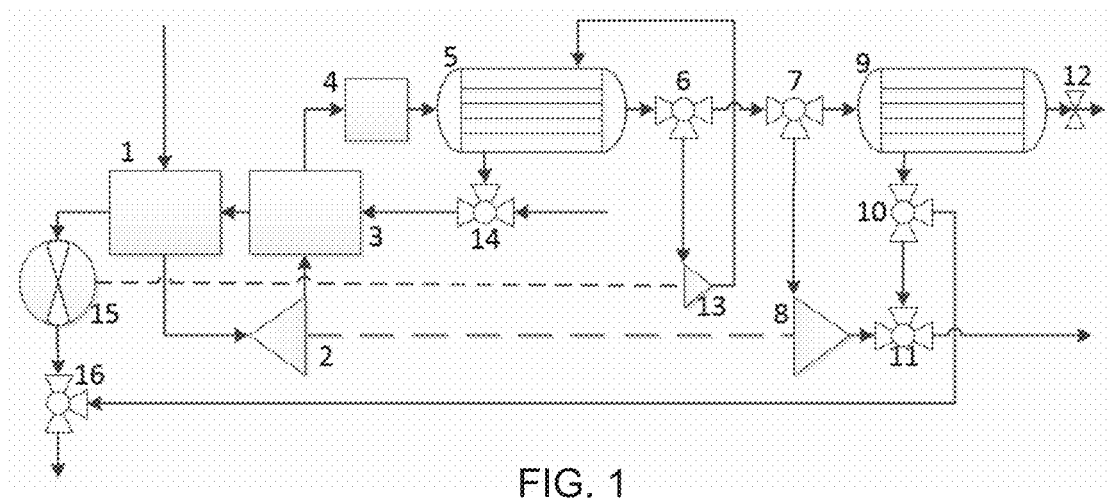
FIG. 1 is a structural diagram of an aircraft environmental control and fuel tank inerting coupling system based on a membrane separation method according to an embodiment of the present invention.

As shown in FIG. 1, an aircraft environment control and tank inerting coupling system based on membrane separation method according to one embodiment of the invention includes: primary heat exchanger (1), compressor (2), secondary heat exchanger (3), filter (4), membrane dehumidifier (5), first three-way valve (6), second three-way valve (7), large expansion turbine (8), membrane air separator (9) The third three-way valve (10), the fourth three-way valve (11), the flow limiting valve (12), the small expansion turbine (13), the fifth three-way valve (14), the fan (15), and the sixth three-way valve (16). Membrane dehumidifier (5) includes shell (5-1), hollow fiber membrane tubes bundle (5-2), moist air inlet (5-3), dry air outlet (5-4), purge air inlet (5-5), purge air outlet (5-6); membrane air separator (9) includes shell (9-1), hollow fiber membrane tubes bundle (9-2), membrane separator inlet (9-3), nitrogen rich air outlet (9-4), oxygen rich air Body outlet (9-5).

Figure 2:
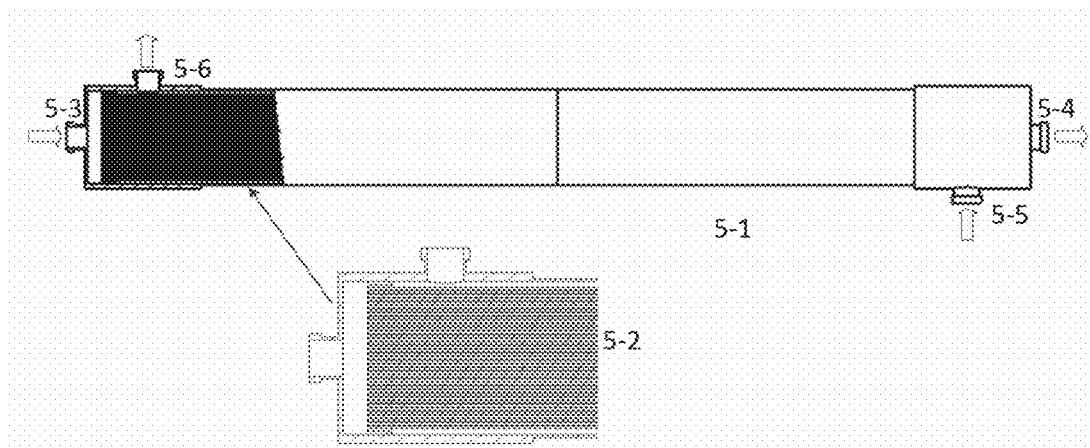
FIG. 2 is a structural diagram of a membrane dehumidifier according to an embodiment of the present invention.

According to an embodiment of the invention, as shown in FIG. 2, the membrane dehumidifier (5) adopts a tube-shell structure with hollow fiber membrane tubes bundle (5-2) installed in the membrane dehumidifier shell (5-1). In the coupling system of aircraft environmental control and fuel tank inerting based on membrane separation, the high-pressure moist air enters the moist air inlet (5-3), flows in the hollow fiber hollow fiber membrane tubes bundle (5-2), and the dry air after dehumidification is discharged from the dry air outlet (5-4), enters the first three-way valve (6), and is divided into two streams of air flow. A small proportion of the air stream enters the purge air inlet (5-5) on the wall side of the shell (5-1) of the membrane dehumidifier as the purge air. The purge air takes away water vapor penetrating from the inner side of the hollow fiber hollow fiber membrane tubes to the outer side of the tubes, and discharges from the purge air outlet (5-6) on the wall side of the shell.

First, bleed air from aircraft engine is regulated to the proper temperature and pressure through the primary heat exchanger, compressor and secondary heat exchanger respectively, and then the oil and dust particles in the air are filtered out by the filter. The high-pressure moist air after the filter (4) enters the moist air inlet (5-3), flows in the hollow fiber hollow fiber membrane tubes bundle (5-2), and the dry air after dehumidification is discharged from the dry air outlet (5-4), enters the first three-way valve (6), and is divided into two streams.

Figure 3:
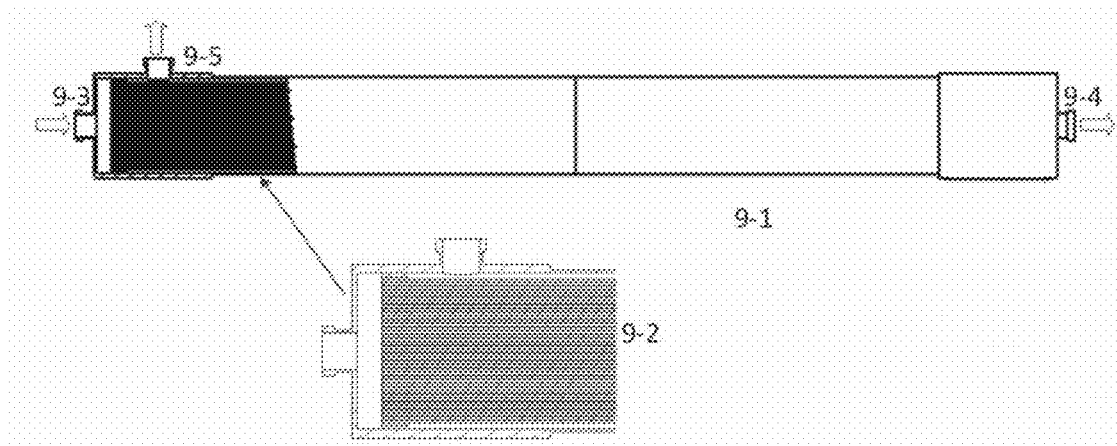
FIG. 3 is a structural diagram of a membrane air separator according to an embodiment of the present invention.

The smaller flow of the above two air streams enters the purge air inlet (5-5) as purge air, which takes away the water vapor penetrating from the inner side of the hollow fiber membrane tubes to the outer side of the hollow fiber membrane tubes, and exhausts from the purge air outlet (5-6), The larger flow of the above two air streams is divided again by the second three-way valve (7) according to the set proportion, the main stream air of it is expanded and cooled by the large expansion turbine (8) and then enters the cabin for cooling, and the secondary stream of it enters the membrane air separator (9) for oxygen nitrogen separation, The fifth three-way valve (14) is used to mix the air stream from the purge air outlet (5-6) with the ram air from outside the aircraft, and the mixed air is used as the cold side air stream of both the secondary heat exchanger and the primary heat exchanger, The membrane air separator (9) also adopts a tube-shell structure with hollow fiber membrane tubes bundle (9-2) for oxygen nitrogen separation installed inside the air separator shell (9-1), as shown in FIG. 3. In the coupling system of aircraft environment control and fuel tank inerting based on membrane separation, air enters the inlet (9-3) of membrane separator, flows in hollow fiber membrane tubes bundle (9-2), and the nitrogen rich air after oxygen nitrogen separation is discharged from the nitrogen rich air outlet (9-4), flows into fuel tank for inerting through flow limiting valve (12), and the oxygen rich air is discharged from the oxygen rich air outlet (9-5). After passing the third three-way valve (10), it will enter the cabin or discharge to the external environment according to the required proportion.

A smaller air stream from the second three-way valve (7) enters the membrane separator inlet (9-3) and flows in the hollow fiber membrane tubes bundle (9-2).

The nitrogen enriched air after oxygen nitrogen separation is discharged from the nitrogen rich air outlet (9-4), and then flows into the fuel tank through the flow limiting valve (12) for inerting.

After the separation of oxygen and nitrogen, the oxygen enriched air is discharged from the oxygen enriched air outlet (9-5). After passing through the third three-way valve (10), the air is divided into two airstreams according to the required proportion. One air stream after the separation is sent to the fourth three-way valve (11), and the other stream after the separation is sent to the sixth three-way valve (16).

The air after being expanded by the large expansion turbine (8) is used as the cabin supply cooling air. The fourth three-way valve (11) is used to mix part of the oxygen rich air and the cabin supply cooling air, then the mixed cooling and oxygen rich air flows to cabin.

The sixth three-way valve (16) is used to mix the outlet air flow of fan (15) which is the hot side air stream of the primary heat exchanger with the oxygen rich air from the third three-way valve (10), and the mixed air stream is discharged into the atmosphere.

The membrane dehumidifier (5) is used for dehumidification of high-pressure moist air. The high-pressure moist air is introduced into the hollow fiber membrane tubes bundle (5-2) of the membrane dehumidifier (5), and a small amount of low-pressure dry air obtained after dehumidification and then expansion by small turbine (13) is introduced into the shell (5-1) as purge air. Driven by partial pressure difference of water vapor in moist air between the tube side and the shell side, the water vapor penetrates into the shell side to achieve the purpose of air dehumidification at the tube side.

In addition, the membrane dehumidifier (5), as a total heat exchanger of dehumidification and heat exchange, can dehumidify and cool the high-pressure moist air. The high temperature, high pressure and high humidity air enters into the hollow fiber membrane tubes bundle (5-2) of the membrane dehumidifier (5), and the temperature of the dry air in the shell (5-1) side is low, so there is a temperature difference between the air stream at the tube side and the shell side, resulting in heat exchange, so the air temperature at the tube side outlet (5-4) of the membrane dehumidifier (5) is lower than that at the tube side inlet (5-3).

In the membrane air separator (9), the air with relatively high pressure enters the membrane separator inlet (9-3) and flows in the hollow fiber membrane tubes bundle (9-2). According to the different rate of oxygen and nitrogen passing through the wall of the hollow fiber membrane tubes, under the pressure difference between the inner and outer sides of the membrane, a large amount of oxygen and a small amount of nitrogen passing through the wall of the hollow fiber membrane tubes enter the shell side of the membrane air separator (9) to become oxygen rich air, and the remaining air inside the hollow fiber membrane tubes become nitrogen rich air with oxygen content decreases. The nitrogen rich air is discharged from the nitrogen rich air outlet (9-4) of the membrane air separator (9), and then flows into the fuel tank for inerting through the flow limiting valve (12). The oxygen rich air is discharged from the oxygen rich air outlet (9-5). After passing through the third three-way valve (10), it flows into the cabin or discharges to the external environment according to the required proportion.

According to the embodiment of the invention, the membrane dehumidifier (5) and the membrane air separator (9) are made of organic and/or inorganic membrane materials, and the membrane dehumidifier (5) and the membrane air separator (9) are both tube-shell structure with hollow fiber membrane tubes bundle inside the shell. Membrane materials have a specific requirement of air temperature, pressure, pollutant particle size and oil content. And the membrane air separator (9) has extra requirements for the moisture content of air.

Therefore, a filter (4) is used to filter the bleed air. In the coupling system provided by the invention, the filter is responsible for filtering the dust and oil contamination contained in the bleed air of the engine, so that the air particle size and oil content meet the requirements of the membrane dehumidifier (5) and the membrane air separator (9).

The temperature, pressure, moisture content, particle size and oil content of the dry high-pressure air after dehumidification and cooling of the membrane dehumidifier (5) meet the inlet air requirements of the membrane air separator (9), so the coupling of the aircraft environmental control system and the tank inerting system can be realized. The connection between the outlet of the membrane dehumidifier (5) and the inlet of the membrane air separator (9) is by flow regulation of the first three-way valve (6) and the second three-way valve (7), there is no need for additional temperature and pressure regulating devices for the membrane air separator (9).

According to an embodiment of the invention, a small expansion turbine (13) is arranged for reducing the pressure of the air stream from the first three-way valve (6) to be the purging air. Since the dehumidification process in the membrane dehumidifier (5) is driven by partial pressure difference of water vapor in the air streams between the tubes side and the shell side, the partial pressure of water vapor in the air at shell side is reduced as well as the total pressure of the purging air, which is helpful to increase the partial pressure difference of water vapor between both sides of the membrane wall, so as to improve the dehumidification efficiency, The purge air after expansion by the small expansion turbine (13) enters the shell side of the membrane dehumidifier (5) through the purge air inlet (5-5).

When the purge air is expanded by a small expansion turbine (13), the temperature of the air is also reduced, so that the temperature of the air stream at the shell side of the membrane dehumidifier (5) is reduced, the temperature difference of the air streams between the shell side and the tube side is enlarged, and the heat exchange effect is strengthened.

Fan (15) is used to ventilate the cold side air stream of the secondary heat exchanger and the primary heat exchanger to increase heat exchange, and the air stream at the fan outlet enters the sixth three-way valve (16).

In the system, six three-way valves and one flow limiting valve are used, which can split, mix and limit the flow of airstream.

Of the six three-way valves, the second three-way valve (7) and the flow limiting valve (12) jointly limit the mass flow of nitrogen rich air. In different flight stages, the fuel tank has different requirements for mass flow of the nitrogen rich air. Therefore, by limiting the air mass flow into the membrane air separator (9) and the air mass flow at the nitrogen rich air outlet (9-4), the requirements for the nitrogen rich air mass flow at different flight stages can be met.

The first three-way valve (6) is used to split the dehumidified dry air. After dehumidification by membrane dehumidifier (5), the moist air becomes low humidity dry air, which is discharged from the dry air outlet (5-4) and enters the first three-way valve (6), and is divided according to the set ratio. A large proportion of the air stream is the required high-pressure dry air, which can be used for cabin cooling and fuel tank inerting after further treatment. The small proportion of the air stream flows through the small expansion turbine (13) to expand and depressurize, and then it is used as purge air to enter the shell side of the membrane dehumidifier (5) through the purge air inlet (5-5).

The third three-way valve (10) is used to split the oxygen enriched air at the outlet (9-5) of the membrane air separator (9). In different flight stages, the required nitrogen rich air mass flow is different, so the oxygen rich air mass flow will also vary with the flight stages. In consideration of the oxygen content and temperature of the cabin air supply, different split ratio is set for the third three-way valve (10) in different flight stages. After split of the air according to a set proportion, one part of the oxygen rich air enters the cabin and the other part is discharged to the atmosphere.

The fourth three-way valve (11) is used to mix the oxygen enriched air with the cabin air supply. After the main air is expanded and cooled by the large expansion turbine (8), it is mixed with a part of the oxygen rich air produced by the membrane air separator (9) in the fourth three-way valve (11). The oxygen content of the mixed air increases, decreasing the cabin altitude which is beneficial for aircraft pilot and passengers without increasing the total pressure of the cabin.

According to the invention, an aircraft environment control and tank inerting coupling method based on membrane separation is provided, the method includes:

regulating the engine bleed air to the proper temperature and pressure through the primary heat exchanger, compressor and secondary heat exchanger, and then the oil and dust are filtered out by the filter, allowing the high-pressure moist air after filtration by the filter (4) to enter the moist air inlet (5-3), flows in the hollow fiber membrane tubes bundle (5-2), and allowing the dry air after dehumidification to be discharged from the dry air outlet (5-4) and to enter the first three-way valve (6), and is divided into two streams using the smaller air stream of the two streams as purge air and allowing it to enter the purge air inlet (5-5), to sweep away the water vapor of the larger air stream permeated from the inner side of the hollow fiber membrane tubes, and to be discharged from the purge air outlet (5-6), allowing the larger one of the two streams to be divided again by the second three-way valve (7) according to a preset ration, allowing the main one of the divided air streams to be expanded and cooled by passing through the large expansion turbine (8) and then to flow into the cabin for cooling, allowing the minor one of the divided air streams to enter the membrane air separator (9) for oxygen-nitrogen separation; the membrane air separator (9) adopts a tube-shell structure of hollow fiber membrane tubes including a shell (9-1), hollow fiber membrane tube bundle (9-2) for oxygen-nitrogen separation installed inside the shell (9-1), membrane separator inlet (9-3), a nitrogen-rich air outlet (9-4), and an oxygen-rich air outlet (9-5)

allowing the air stream from the membrane dehumidifier purge air outlet (5-6) to be mixed with the ram air outside the aircraft by the fifth three-way valve (14), and using the mixed air as the cold side air stream of both the secondary heat exchanger and the primary heat exchanger, allowing the minor air stream from the second three-way valve (7) to enter the membrane separator inlet (9-3) and to flow in the hollow fiber membrane tubes bundle (9-2), allowing the nitrogen-rich air from oxygen-nitrogen separation to be discharged from the nitrogen-rich air outlet (9-4) and then to flow into the fuel tank through the flow limiting valve (12) for fuel tank inertization, allowing the oxygen-rich gas from oxygen-nitrogen separation to be discharged from the oxygen-rich air outlet (9-5) and to be divided according to a present ration by the third three-way valve (10), and allowing on of the divided air streams to be sent to the fourth three-way valve (11) and allowing the other of the divided air streams to be sent to the sixth three-way valve (16), using the fourth three-way valve (11) to mix the oxygen-rich gas air with cabin air supply, which is the air after the expansion and cooling by the large expansion turbine (8) and which is mixed gas in the fourth three-way valve (11) with the oxygen-rich air divided by the third three-way valve (10), and allowing the mix air to enter the cabin, using the sixth three-way valve (16) to mix the cold side air stream of the primary heat exchanger with the oxygen-rich air from the third three-way valve (10), and discharging the mixed air stream into the atmosphere.

According to an embodiment of the invention, in the coupling method of aircraft environmental control and fuel tank inertization, dehumidification of high pressure moist air is performed by means of membrane dehumidifier (5), including:

introducing the high-pressure moist air into the hollow fiber membrane tubes bundle (5-2) of the membrane dehumidifier (5), introducing a small portion of the low-pressure dry air obtained after dehumidification into shell (5-1) as purge gas, allowing water vapor to enter the shell side under the action of the partial pressure difference between the water vapor at the tube side and the water vapor at the shell side, so as to achieve the purpose of air dehumidification at the tube side, using the membrane dehumidifier (5) as a total heat exchanger to dehumidify and cool the high pressure moist air, wherein the high temperature, high pressure and high humidity air enters the hollow fiber membrane tubes bundle (5-2) of the membrane dehumidifier (5), while the temperature of the dry air in the shell (5-1) is relatively low, so that there is a temperature difference between the air stream at the tube side and air stream at the shell side, resulting in heat exchange, and wherein the air temperature at the outlet of the tube side of the membrane dehumidifier (5) is lower than that at the inlet of the tube side.

According to an embodiment of the invention, in the above coupling method of aircraft environmental control and fuel tank inertization:

in the membrane air separator (9), the high pressure dry air is allowed to enter the inlet (9-3) of the membrane air separator and to flow in the hollow fiber membrane tubes bundle (9-2); in accordance with the different rates at which oxygen and nitrogen penetrate the wall of the hollow fiber membrane tubes respectively, under the pressure difference between the wall of the inner and outer sides of the membrane tubes, a larger amount of oxygen and a smaller amount of nitrogen enter the shell side of the membrane air separator (9) and form oxygen-rich air; the oxygen content in the air inside the hollow fiber membrane tubes decreases and the air becomes nitrogen-rich. The nitrogen-rich air is discharged from the outlet (9-4) of the membrane air separator (9), and then flows into the fuel tank through the flow limiting valve (12) for inerting the fuel tank. The oxygen-rich air is discharged from the outlet (9-5), and then flows into the cockpit or cabin or directly exits to the external environment according to the required proportion through the third way valve (10).

Having thus described our invention and the manner of its use, we claim:

1. A coupling system for aircraft environmental control and fuel tank inerting based on membrane separation, comprising:

a primary heat exchanger (1), a compressor (2), a secondary heat exchanger (3), a filter (4), a membrane dehumidifier (5), a first three-way valve (6), a second three-way valve (7), a large expansion turbine (8), a membrane air separator (9), a third three-way valve (10), a fourth three-way valve (11), a flow-limiting valve (12), a fifth three-way valve (14), and a sixth three-way valve (16), wherein the membrane dehumidifier (5) adopts a first tube-shell structure of first hollow fiber membrane tubes and includes:

a first shell (5-1), a first hollow fiber membrane tube bundle (5-2) for dehumidification installed in the shell (5-1), a humid air inlet (5-3), a dry air outlet (5-4), a purge gas inlet (5-5) on a side wall of the first shell (5-1), and a purge gas outlet (5-6) on the side wall of the first shell (5-1), wherein bleed air from an engine of an aircraft is first adjusted to appropriate temperature and pressure through the primary heat exchanger (1), the compressor (2) and the secondary heat exchanger (3), and then oil and dust in the bleed air are filtered by the filter (4), wherein high-pressure humid air from the filter (4) enters through the humid air inlet (5-3), flows through the first hollow fiber membrane tube bundle (5-2), exits as dry air after dehumidification from the dry air outlet (5-4), and enters the first three-way valve (6) and is divided into a smaller airstream and a larger airstream, wherein the smaller airstream enters as purge gas through the purge gas inlet (5-5), which takes away water vapor that penetrates from inside of the first hollow fiber membrane tube bundle (5-2) to the outside of the first hollow fiber membrane tube bundle (5-2), the smaller airstream exiting from the purge gas outlet (5-6) as a flow of humid air, wherein the larger airstream from the 3-way valve 6 is divided again into a major airstream and a minor airstream by the second three-way valve (7) according to a preset ratio, the major airstream from the second three-way valve (7) expands and cools while going through the large expansion turbine (8) and then enters via 3-way valve 11 into an aircraft cabin for cooling, the minor airstream from the second three-way valve (7) enters the membrane air separator (9) for oxygen-nitrogen separation, wherein the fifth three-way valve (14) mixes the flow of humid air from the purge gas outlet (5-6) with ram air from atmosphere outside the aircraft, with the flow of humid air mixed with the ram air being used as cold side airflow through the secondary heat exchanger (3) and the primary heat exchanger (1), wherein the membrane air separator (9) adopts a second tube-shell structure of second hollow fiber membrane tubes and includes:

a second shell (9-1), a second hollow fiber membrane tube bundle (9-2) for oxygen-nitrogen separation installed in the second shell (9-1), a membrane separator inlet (9-3), a nitrogen-rich air outlet (9-4), and an oxygen-rich air outlet (9-5), wherein the minor one of the divided air streams from the second three-way valve (7) enters the membrane separator inlet (9-3) and flows through the second hollow fiber membrane tube bundle (9-2), wherein nitrogen-rich air after the oxygen-nitrogen separation exits from the nitrogen-rich air outlet (9-4) and enters a fuel tank via the flow-limiting valve (12) for inertization, wherein oxygen-rich air after the oxygen-nitrogen separation exits from the oxygen-rich air outlet (9-5) and is then divided by the third three-way valve (10) according to a preset ratio, with one of the divided oxygen-rich air streams going to the fourth three-way valve (11) while another of the divided oxygen-rich air streams from oxygen-rich air outlet (9-5) going to the sixth three-way valve (16), wherein the fourth three-way valve (11) mixes the one of the divided oxygen-rich air streams with the aircraft cabin air supply from the second 3 way valve 7, which is air expanded and cooled by the large expansion turbine (8) and which is mixed at the fourth three-way valve (11) with the one of the divided oxygen-rich air streams from the third three-way valve (10), and resulting oxygen-rich air is provided to the aircraft cabin, and wherein the sixth three-way valve (16) mixes hot side airflow of the primary heat exchanger (1) and the another of the divided oxygen-rich air streams from the third three-way valve (10), and the mixed said hot side airflow and said another of the divided oxygen-rich air streams is discharged into the atmosphere.

2. The coupling system for aircraft environmental control and fuel tank inerting based on membrane separation according to claim 1, wherein:

the membrane dehumidifier (5) is used to dehumidify the high-pressure humid air from filter 4, the high-pressure humid air passing into the first hollow fiber membrane tube bundle (5-2) of the membrane dehumidifier (5), with a small amount of the dry air obtained after dehumidification is used as the purge gas, with water vapor driven by a difference in partial pressure from of a tube side of the first hollow fiber membrane tube bundle (5-2) to a shell side of shell (9-1), wherein the water vapor enters the shell side from the tube side to achieve tube side gas dehumidification, and membrane dehumidifier (5) also serves as an integrated dehumidifier and heat exchanger that dehumidifies and cools the high-pressure humid air from filter 4 wherein a temperature of the purge gas in the shell (5-1) is also lower, so that there is a temperature difference between the high pressure humid air in the first hollow fiber membrane tube bundle (5-2) tube side and the purge gas in the shell side such that a temperature of the dry air at the dry air outlet (5-4) will be lower than a temperature of the high pressure humid air at the humid air inlet (5-3).

3. The coupling system for aircraft environmental control and fuel tank inerting based on membrane separation according to claim 1, wherein:

in the membrane air separator (9), the minor one of the divided air streams from 3-way valve 7 enters the membrane separator inlet (9-3) and flows through the second hollow fiber membrane tube bundle (9-2), wherein a large amount of oxygen and a small amount of nitrogen pass through walls of the second hollow fiber membrane tube bundle (9-2) and enter a shell side of the membrane air separator (9) to become the oxygen-rich air under the pressure difference between an inside and outside of the second hollow fiber membrane tube bundle (9-2), the nitrogen rich air discharged from the nitrogen-rich air outlet (9-4) of the membrane air separator (9) and passed through the restriction valve (12) to the fuel tank for inertization, and the oxygen-rich air passed through the third three-way valve (10) to the aircraft cabin in a required proportion via fourth 3-way valve (11) or discharged to the atmosphere via sixth 3-way valve (16).

4. The coupling system for aircraft environmental control and fuel tank inerting based on membrane separation according to claim 1, wherein:

the membrane dehumidifier (5) and the membrane air separator (9) are made of organic and/or inorganic membrane materials and use the hollow fiber membrane tubes (5-2, 9-2) densely bundled inside respective shells (5-1), (9-1) in a packed tube structure, the membrane material for both the hollow fiber membrane tube bundles (5-2, 9-2) have requirements of temperature, pressure, particle size and oil content of a gas passing therethrough, and the hollow fiber membrane tube bundle (9-2) of membrane air separator (9) has additional requirements of moisture content of the gas passing therethrough, the filter (4) is used to filter the bleed air, so that the oil and dust content meet the requirements of the membrane dehumidifier (5) and the membrane air separator (9), temperature, pressure, moisture content, particle size, and oil content of the dry air after it is dehumidified and cooled by the membrane dehumidifier (5) meet the requirements of the membrane air separator (9) for the dry air, thereby achieving coupling of the aircraft environmental control and the fuel tank inerting, between the dry air outlet (5-4) of the membrane dehumidifier (5) and the membrane separator inlet (9-3) of the membrane air separator (9), flow adjustment is performed only with respect to the first three-way valve (6) and the second three-way valve (7), and no other adjusting means needs to be provided.

5. The coupling system for aircraft environmental control and fuel tank inerting based on membrane separation according to claim 1, wherein:

a small expansion turbine (13) for depressurizing the smaller airstream from the first three-way valve (6), which is used as the purge gas, Since a dehumidification process in the membrane dehumidifier (5) is driven by a partial pressure difference between the water vapor in a tube side of hollow fiber membrane tube bundle (5-2) and the water vapor in a shell side of shell (5-1), a value of the partial pressure of the water vapor in the shell side is reduced by reducing pressure of the purge gas, which helps to increase the partial pressure difference between the water vapor on both sides of the hollow fiber membrane tube bundle (5-2), thereby improving dehumidification efficiency, the purge gas, after expansion and depressurization by the small expansion turbine (13), enters the shell side of the membrane dehumidifier (5) through the purge gas inlet (5-5), and:

when the purge gas is expanded and depressurized by the small expansion turbine (13), temperature of the purge gas is lowered, thereby lowering temperature of the purge gas in the shell side of the membrane dehumidifier (5) and increasing the temperature difference between the purge gas in the shell side and high pressure humid air flowing through the hollow fiber membrane tube bundle (5-2) to enhance vapor pressure exchange effect.

6. The coupling system for aircraft environmental control and fuel tank inerting based on membrane separation according to claim 1, further comprising:

a fan (15) connected to the cold side of the primary heat exchanger for sucking the cold side airflow from ram air through of the cold side of the secondary heat exchanger (3) via a connection to the cold side of the primary heat exchanger (1) to enhance heat exchange, after which airflow from the fan (15) enters the sixth three-way valve (16) and is exhausted to atmosphere.

7. The coupling system for aircraft environmental control and fuel tank inerting based on membrane separation according to claim 1, wherein:

a total of six three-way valves and one flow limiting valve are used, the six three-way valves and one flow limiting valve which play a role of diverting, mixing and restricting the bleed air, the second three-way valve (7) and the restriction valve (12) work together to limit flow of the nitrogen-rich air at different stages of flight due to the fuel tank having different requirements for the flow of the nitrogen-rich air, after the high pressure humid air is dehumidified by the membrane dehumidifier (5), the dry air is discharged from the dry air outlet (5-4), enters the first three-way valve (6), and is divided according to a set ratio into the smaller airstream and the larger airstream, with the larger airstream applied to 3-way valve 7 and used for cabin cooling, oxygen enrichment and fuel tank inerting while the smaller airstream is expanded and reduced by the small expansion turbine (13) and used as the purge gas through the shell (5-1) of the membrane dehumidifier 5, while the third three-way valve (10) is used to split the oxygen-rich air at the oxygen-rich air outlet (9-5) of the membrane air separator (9), and as different nitrogen-rich air flows are required at the different stages of aircraft flight, and in consideration of oxygen content and temperature changes of aircraft cabin air supply during the different stages of flight, different preset ratios are set for the third three-way valve (10) during the different stages of flight, and after division, the one of the divided oxygen-rich air streams enters the aircraft cabin, and the another of the oxygen-rich air streams is discharged to the atmosphere, while the fourth three-way valve (11) is used to mix the one of the divided oxygen-rich airstreams with the aircraft cabin air supply, and after the larger airstream expands and cools through the large expansion turbine (8), the larger airflow being mixed with the one of the divided oxygen-rich airstreams from the membrane air separator (9) in the set ratio that varies with the different stages of flight, which improves air supply quality of the aircraft cabin.

\* \* \* \* \*